Aug. 11, 1964  F. A. CLAESSENS  3,144,378
METHOD AND APPARATUS FOR FORMING
ASBESTOS-CEMENT PRODUCTS
Filed June 20, 1962

INVENTOR.
FRANK A. CLAESSENS
BY
*John A. McKinney*
ATTORNEY

United States Patent Office 3,144,378
Patented Aug. 11, 1964

3,144,378
METHOD AND APPARATUS FOR FORMING ASBESTOS-CEMENT PRODUCTS
Frank A. Claessens, Somerville, N.J., assignor to Johns-Manville Corporation, New York, N.Y., a corporation of New York
Filed June 20, 1962, Ser. No. 203,963
7 Claims. (Cl. 162—122)

This invention relates to method and apparatus for use in forming asbestos-cement products and is particularly directed to method and apparatus for effecting a separation of the asbestos-cement stock in the manufacture of asbestos-cement pipe wherein wet asbestos-cement stock is collected on a rotating mandrel.

In the manufacture of asbestos-cement products and in particular the manufacture of asbestos-cement pipe utilizing a system such as that described in Swensen, U.S. Patent No. 3,000,776, and Rembert, U.S. Patent No. 2,322,592, a felt is arranged to pick up a wet asbestos-cement stock which is then collected on a rotating mandrel. When a wall thickness of a predetermined amount has been built up on the rotating mandrel, it is necessary to effect a separation of the stock between the felt and the mandrel. Many difficulties have been encountered in obtaining a clean separation of the stock between the felt and mandrel in the manufacture of asbestos-cement products so that the mandrel with the formed stock thereon can be removed for further processing.

It is an object of the instant invention to provide method and apparatus for effecting a separation of the asbestos-cement stock between the felt and the mandrel in the manufacture of asbestos-cement products.

The foregoing object is accomplished in accordance with the instant invention by forming asbestos-cement products generally in accordance with the disclosure in the above-cited Swensen patent. When the asbestos-cement stock on the mandrel has reached a desired wall thickness, the forming operation is stopped and the press rolls are raised. At this stage of the operations, the asbestos-cement stock is bonded to the mandrel in such a manner that any movement of the mandrel will result in corresponding movement of the asbestos-cement stock thereon. The mandrel is then moved in a direction generally parallel to the longitudinal axis thereof. This movement of the mandrel effects a separation of the stock between that on the felt and that on the mandrel. The mandrel and the stock thereon are then moved from the forming mechanisms for further processing.

The invention will be more fully understood and further objects and advantages thereof will become apparent when reference is made to the following detailed description of a preferred embodiment of the invention and the accompanying drawings in which.

Figure 1:
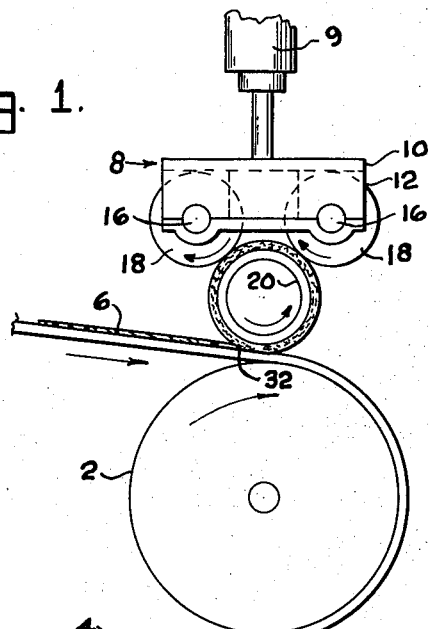
FIG. 1 is a side elevation illustrating the forming section of a pipe machine.
Figure 2:
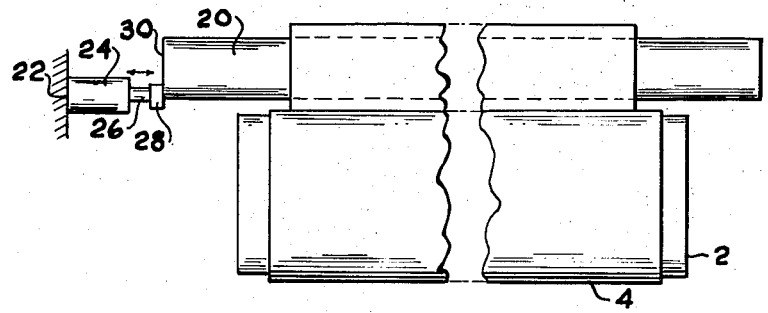
FIG. 2 is a front elevation illustrating the main parts of the present invention.

Referring to the drawing, there is illustrated in FIGS. 1 and 2 an anvil roll 2 over which there travels a felt 4 arranged to pick up a stock 6 of wet asbestos-cement from the cylinder mold or molds (not shown) of a conventional machine such as that illustrated in Rembert, U.S. Patent No. 2,322,592. The anvil roll 2 is a rigid element capable of withstanding pipe forming pressures without flexing and is rotated by conventional means (not shown) to drive the felt 4 in a direction indicated by the arrows in FIG. 1. Positioned above the anvil roll is an upper press section, generally designated 8, moving toward and away from the anvil roll 2 by a hydraulic or screw means 9. The upper press section includes a heavy bar 10 having depending end portions 12 and longitudinally offset pairs of depending intermediate portions (not shown) arranged to provide journals for the shafts 16 of two rows of press rolls 18. The apparatus as broadly described above is entirely conventional and is operated in a conventional manner. With the upper press section 8 in a raised position, a mandrel 20 is placed on the anvil roll 2. The upper press section is then lowered until the press rolls 18 engage the mandrel and hold it in place on the anvil roll 2 which is then rotated in the direction of the arrow thereon. The stock 6 on the felt 4 will adhere to the mandrel 20 rather than to the felt and will be wound upon the mandrel as the mandrel is caused to rotate by the movement of the felt. The stock 6 is collected on the mandrel and is condensed thereon by the press rolls 18. In conventional machines, the press rolls 18 are arranged to exert a pressure on the stock of about 300 pounds per inch of length. Due to these pressures used in the forming cycle, the stock 6 is bonded firmly to the mandrel 20 so that any movement of the mandrel will result in movement of the stock bonded thereto.

In FIG. 2, there is illustrated the main parts of the instant invention which comprises a fixed support 22 to which is secured a cylinder 24. A piston 26, having a head 28 adapted to contact the end 30 of the mandrel 20, is reciprocally mounted in the cylinder 24. The piston 26 functions to move the mandrel, and therefore the asbestos-cement stock on the mandrel, in a direction substantially parallel to the longitudinal axis of the mandrel. This movement of the mandrel effects a separation of the stock 6 along a line parallel to the longitudinal axis of the mandrel 20 illustrated generally in FIG. 1 at 32.

Figure 3:
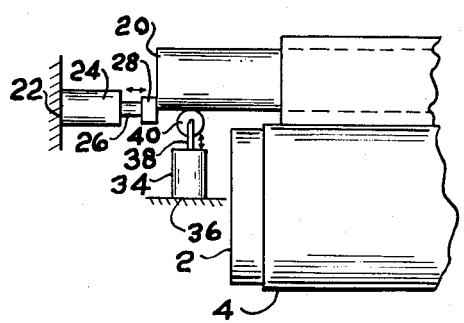
FIG. 3 is a partial front elevation of a modification of the machine of FIG. 2.

In FIG. 3, there is illustrated apparatus for use in accordance with the instant invention when forming a relatively heavy pipe, such as asbestos-cement pipe having a 16 inch diameter or larger. The apparatus in FIG. 3 is similar in all respects to the apparatus illustrated in FIG. 2 and further includes a pair of members arranged to support the mandrel 20. In FIG. 3, only the member on one side of the apparatus is illustrated. Each member comprises a cylinder 34 supported on a fixed base 36. A piston 38 having a head 40 adapted to contact the ends of the mandrel 20 is mounted for reciprocation in each cylinder 34. Each head 40 comprises a roller whose axis of rotation is perpendicular to the longitudinal axis of the mandrel 20. The roller heads 40 support the mandrel 20 so as to allow relative movement between the heads 40 and the mandrel 20. When the stock on the mandrel 20 has reached a desired wall thickness and the forming operation stopped and with the press section 8 in a raised position, pistons 38 are actuated so as to lessen the amount of weight of the mandrel and stock thereon being supported by the anvil roll 2. However, the mandrel and the stock thereon is still partially supported by the anvil roll 2. The piston 26 is then actuated to move the mandrel, and the stock bonded thereto, in a direction substantially parallel to the longitudinal axis thereof. This movement of the mandrel effects a separation of the stock between the felt and the mandrel, as described above. The purpose of the apparatus illustrated in FIG. 3 is to eliminate any tendency for the felt 6 to be moved in a direction generally parallel to the longitudinal axis of the mandrel when the mandrel is moved by the piston 26.

As is clearly evident from the foregoing explanation, the stock between the felt 4 and the mandrel 20 is separated by the movement of the mandrel in a direction generally parallel to the longitudinal axis of the mandrel. While experience has indicated that the stock between the felt and the mandrel may be separated by the movement of the mandrel through a distance as small as about ¼ of an inch, in the preferred embodiment of the instant invention, the mandrel is moved through a distance of about ½ of an inch. Also, while the speed of movement of the mandrel for effecting the separation may be as little as about ¼ of an inch per second, in the preferred embodiment, the mandrel is moved at the rate of about 10 inches per second.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. A method for use in the formation of asbestos-cement products comprising:
   (a) moving a continuous layer of asbestos-cement stock into contact with a mandrel wherein said stock is moved in a direction generally perpendicular to the longitudinal axis of said mandrel,
   (b) rotating said mandrel during said movement of said abestos-cement stock to laminate a plurality of layers of said asbestos-cement stock thereon, and
   (c) stopping the movement of said continuous layer of asbestos-cement stock and the rotation of said mandrel,
   (d) moving said mandrel with said laminations of asbestos-cement stock thereon through a distance in a direction generally parallel to the longitudinal axis of said mandrel, and
   (e) forming a separation of said asbestos-cement stock between said continuous layer of asbestos-cement stock and the laminations of said asbestos-cement stock on said mandrel by said movement thereof.

2. A method for use in the formation of asbestos-cement products comprising:
   (a) passing a felt carrying a continuous layer of asbestos-cement stock over an anvil roll wherein said felt moves in a direction generally perpendicular to the longitudinal axis of said anvil roll,
   (b) supporting a mandrel on said anvil roll with the longitudinal axis of the said mandrel extending generally parallel to the longitudinal axis of said anvil roll and with said mandrel in contact with said asbestos-cement stock,
   (c) rotating said mandrel during said movement of said felt and transferring said layer of asbestos-cement from said felt to said mandrel to laminate a plurality of layers of asbestos-cement stock thereon,
   (d) stopping the movement of said felt with said continuous layer of asbestos-cement stock and the rotation of said mandrel,
   (e) moving said mandrel with said laminations of asbestos-cement stock thereon through a distance in a direction generally parallel to the longitudinal axis of said mandrel, and
   (f) forming a separation of said asbestos-cement stock between the asbestos-cement stock remaining on said felt and the asbestos-cement stock on said mandrel by said movement thereof.

3. A method as defined in claim 2 wherein said movement of said mandrel comprises:
   (a) moving said mandrel with said asbestos-cement stock thereon through a distance greater than one quarter of an inch.

4. A method as defined in claim 2 wherein said movement of said mandrel comprises:
   (a) Moving said mandrel with said asbestos-cement stock thereon through a distance of about one half of an inch.

5. A method as defined in claim 2 wherein said movement of said mandrel comprises:
   (a) moving said mandrel with said asbestos-cement stock thereon at a rate of about ten inches per second.

6. Apparatus for use in the formation of asbestos-cement products comprising:
   (a) an anvil roll supported for rotation about its longitudinal axis,
   (b) a mandrel supported on said anvil roll,
   (c) said mandrel being suitably supported for rotation about its longitudinal axis,
   (d) a felt trained around said anvil roll and passing between said anvil roll and said mandrel,
   (e) means for depositing a continuous layer of asbestos-cement stock onto said felt,
   (f) means for rotating said anvil roll and said mandrel and for moving said felt with said layer of asbestos-cement stock thereon between said anvil roll and said mandrel to wind said asbestos-cement stock on said mandrel and form a plurality of laminations thereon,
   (g) means for stopping the rotation of said anvil roll and said mandrel and the movement of said felt, and
   (h) means for forming a separation of said asbestos-cement stock between said continuous layer of asbestos-cement stock on said felt and the laminations of said asbestos-cement stock on said mandrel comprising,
   (i) means for moving said mandrel with said plurality of laminations of asbestos-cement stock thereon through a distance in a direction generally parallel to the longitudinal axis of said mandrel.

7. Apparatus as defined in claim 6 and further comprising:
   (a) means in addition to said anvil roll for supporting a portion of the weight of said mandrel with said laminations of asbestos-cement stock thereon.

References Cited in the file of this patent

UNITED STATES PATENTS

| | | |
|---|---|---|
| 2,019,890 | Burke | Nov. 5, 1935 |
| 2,087,097 | Sherman | July 13, 1937 |
| 2,182,353 | Rembert | Dec. 5, 1939 |
| 3,000,776 | Swensen | Sept. 19, 1961 |